Aug. 3, 1965 K. R. BETTS 3,198,573
THREE-WAY SEAT ASSEMBLY
Filed May 8, 1962 3 Sheets-Sheet 1

INVENTOR.
Kenneth R. Betts
BY
J. L. Carpenter
ATTORNEY

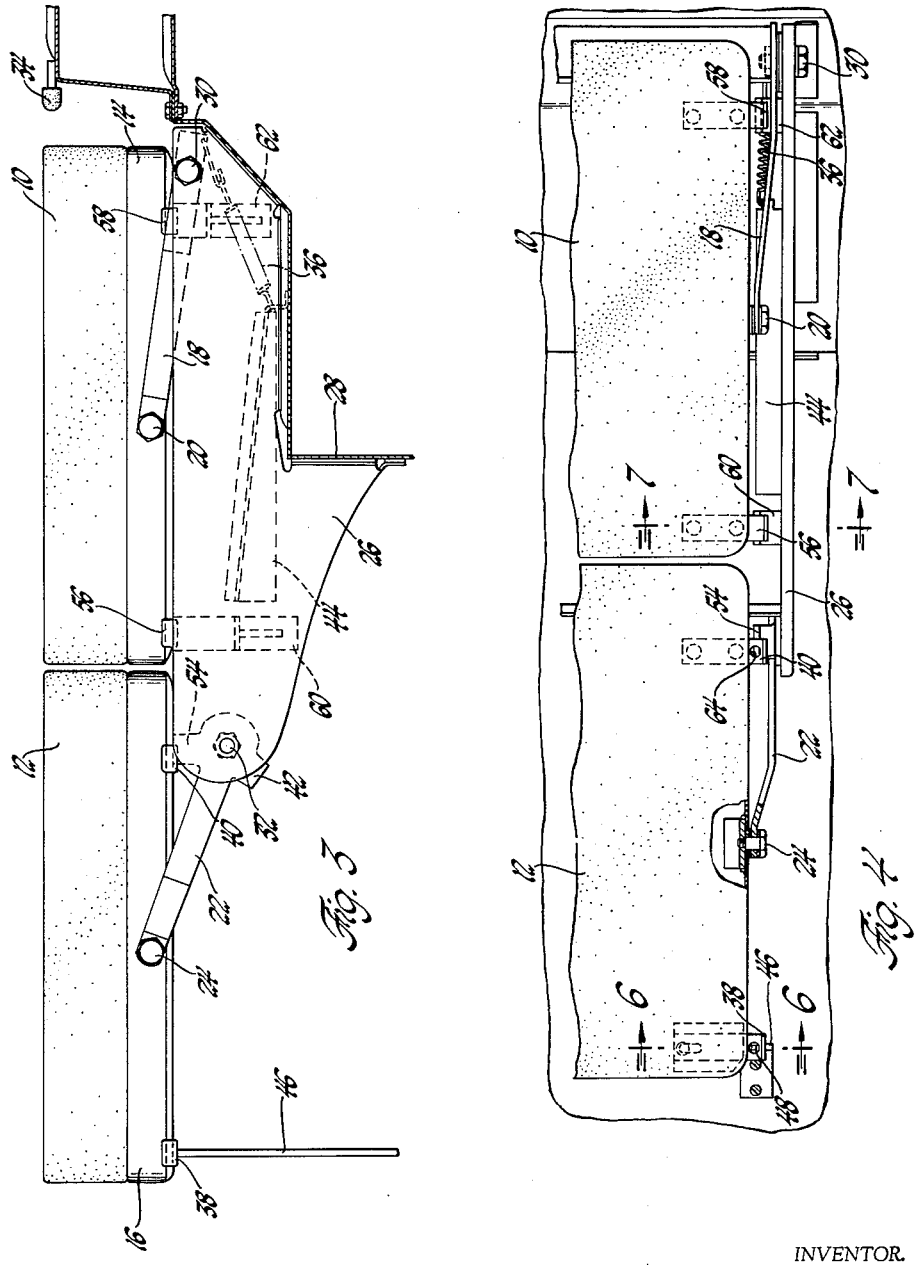

Aug. 3, 1965 K. R. BETTS 3,198,573
THREE-WAY SEAT ASSEMBLY
Filed May 8, 1962 3 Sheets-Sheet 3
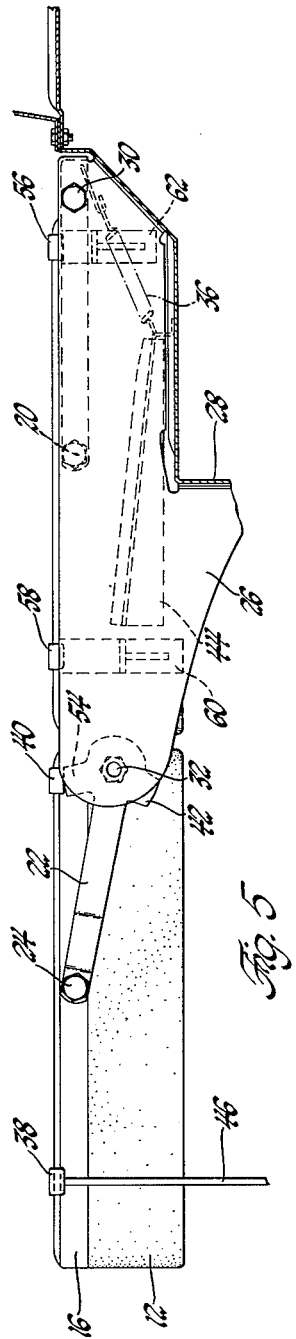
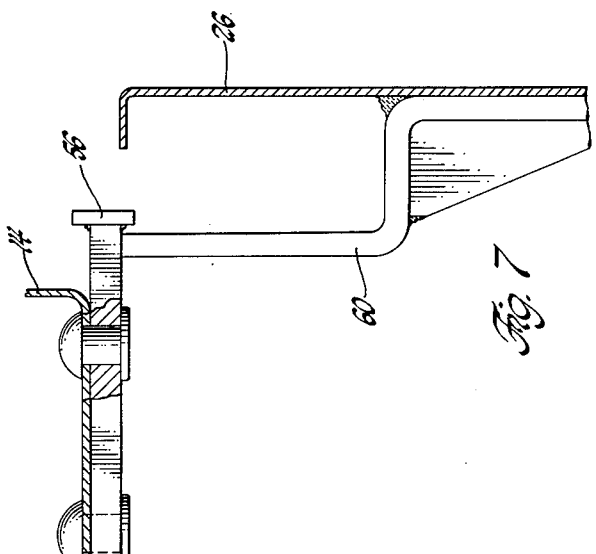
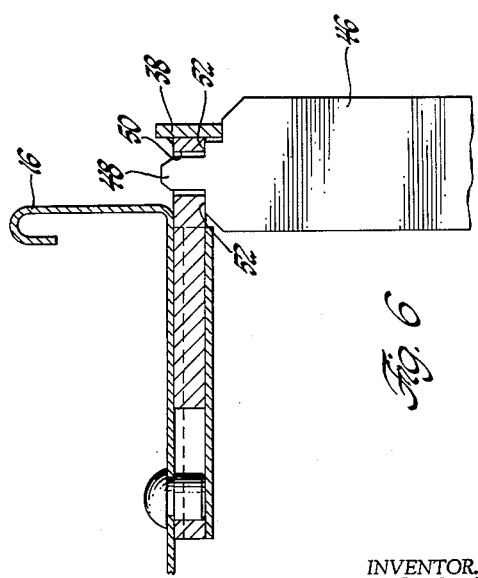
INVENTOR.
Kenneth R. Betts
BY
J. L. Carpenter
ATTORNEY United States Patent Office 3,198,573
Patented Aug. 3, 1965

3,198,573
THREE-WAY SEAT ASSEMBLY
Kenneth R. Betts, Detroit, Mich., assignor to General Motors Corporation, Detroit, Mich., a corporation of Delaware
Filed May 8, 1962, Ser. No. 193,094
4 Claims. (Cl. 296—69)

This invention relates to vehicle seats and more particularly to vehicle seat assembly for multi-purpose vehicles.

The vehicle seat of this invention is intended primarily for use in multi-purpose vehicles such as station wagons. Seating arrangements for vehicles of this type generally include a front or driver's seat and a foldable second seat located rearwardly of the driver's seat. Generally, the foldable second seat can be converted from a normal passenger carrying position to a folded load carrying position.

In the past, the second seat has been merely convertible from a seat position to a folded floor-forming position. The primary object of this invention is to provide an improved vehicle seat assembly for multi-purpose vehicles. A more specific object of this invention is to provide an improved vehicle second seat assembly for a multi-purpose vehicle which is convertible from a seat-forming position to a floor-forming position or convertible to a bed-forming position.

It is another object of this invention to provide means for converting a seat into a bed or floor-forming portion so that a minimum of space is occupied by this seat both in its normal or converted positions.

A further object of this invention is to provide a seat of normal construction which may be converted to a bed or floor-forming position with a minimum of effort.

These and other objects, advantages and features of the invention will become more fully apparent as reference is had to the accompanying specification and drawings wherein:

FIGURE 3 is a side elevational view of the unique seat assembly in the bed-forming position;

FIGURE 4 is a top view, partially in section, showing the vehicle seat linkage in the bed-forming position;

FIGURE 5 is a side elevational view of the unique seat assembly in the floor-forming position;

FIGURE 6 is a view taken substantially along the lines 6—6 as seen in FIGURE 4 showing the mating engagement of the upper end of the hinge leg and the front retractable support bracket; and FIGURE 7 is a view taken substantially along the lines 7—7 of FIGURE 4 showing how the front end lift bracket is supported on the stationary support bracket.

It is to be understood that seat linkages of this type are identical on the left and right hand sides of the seat, for ease of explanation only the left hand linkage will be explained.

Figure 1:
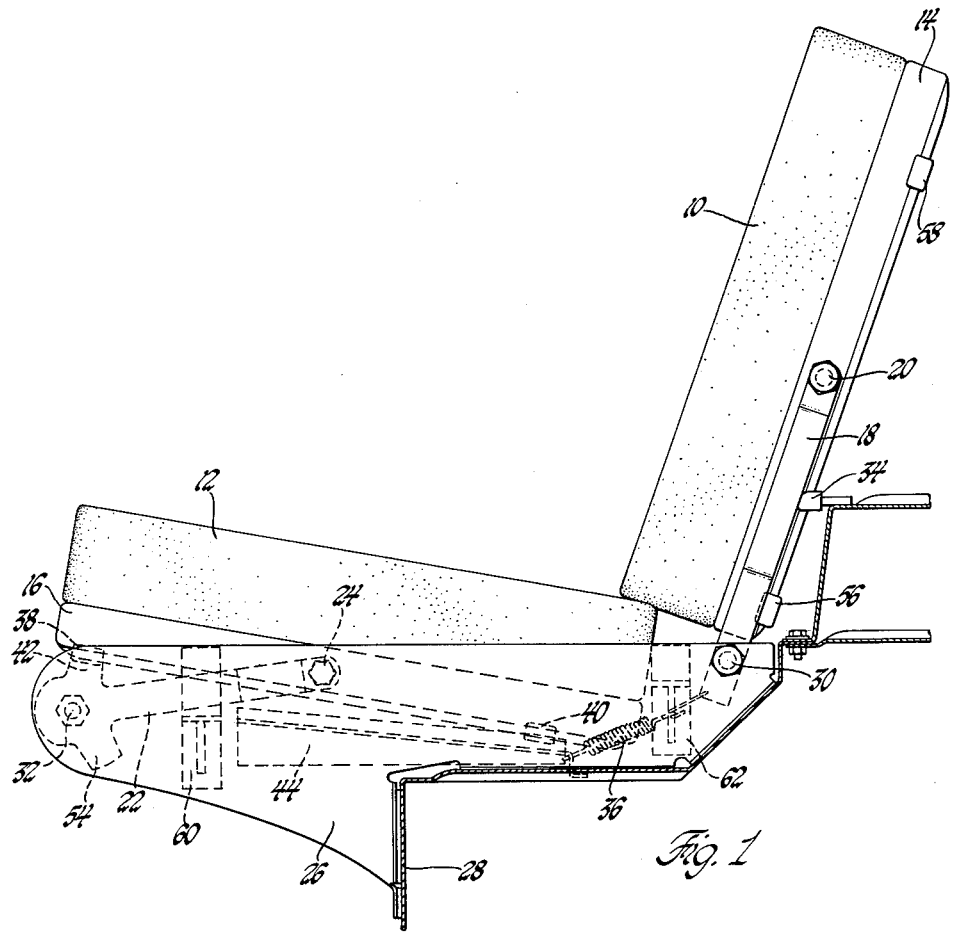
FIGURE 1 is a side elevational view of the unique vehicle seat assembly in the normal seat-forming position.
Figure 2:
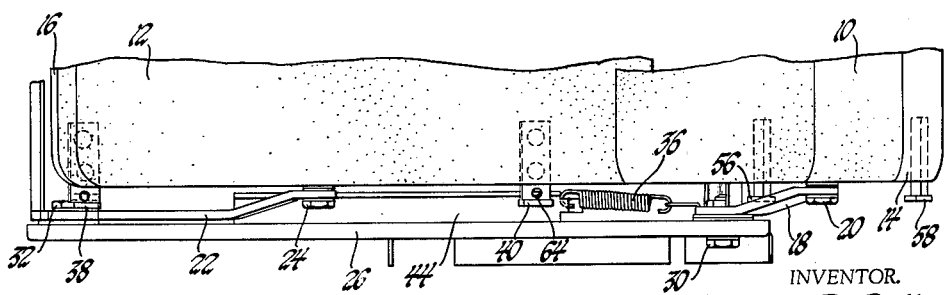
FIGURE 2 is a top view, partially in section, showing the vehicle seat linkage in the seat-forming position.

Referring now to the drawings, and particularly FIGURE 1, there is shown a vehicle seat having a seat back cushion 10 and a seat cushion 12 in a normal seat-forming position. The cushions 10 and 12 are securely mounted in the seat back pan 14 and in the seat pan 16, respectively. The seat back pan 14 is pivotally connected to the seat back control arm 18 by pivot bolt 20 and the seat pan 16 is pivotally connected to the seat control arm 22 by pivot bolt 24. The control arms 18, 22 are pivotally connected to a support flange member 26 which is welded or otherwise suitably secured to the vehicle body 28. The seat back control arm 18 is pivotally connected to the support member 26 by pivot bolt 30. The seat control arm 22 is pivotally connected to the support member 26 by pivot bolt 32.

In the seat-forming position, the seat back control arm 18 rests against a suitable stop member 34 and is spring biased to that position by a tension spring 36 attached to the lower end of the control arm 18. The seat back is held in position by conventional means such as a spring clip attached to the control arm and the seat back pan. The seat is supported in the seat-forming position by a front retractable support bracket 38 and a rear permanent support bracket 40. A radially extending flange 42 at one end of the front control arm 22 cooperates with the front retractable support bracket 38 to support the front end of this seat in the seat-forming position. A guide bracket 44 attached to the support member 26 by welding or other suitable means cooperates with the rear permanent support bracket 40 to support the rear of this seat in the seat-forming position.

The seat back and the seat units can pivot clockwise and counterclockwise about their pivot points 20, 24. When the seat units are moved forwardly and pivoted clockwise about their pivot points 20, 24 from the seat-forming position, the control arms 18, 22 pivot counterclockwise about the pivot bolts 30, 32 and the upright seat is converted into a bed-forming position with the seat cushions 10, 12 positioned uppermost as seen in FIGURE 3. If the seat units are rotated counterclockwise about their pivot points 20, 24 during forward movement from the seat-forming position, the pan sections of the seat units will be positioned uppermost in a floor-forming position, as seen in FIGURE 5.

When the seat is pivoted forward from its seat-forming position to the bed-forming position, a leg support 46 is unfolded from its stored position to cooperate with the front retractable support bracket 38 to support the front edge of the seat in the bed-forming position. The upper end of the support leg has a guide lug 48 which is received in the hole 50 in the front retractable support bracket 38 to guide the members into proper alignment. The support leg 46 has a shoulder portion 52 which cooperates with the front retractable support bracket 38 to support the front edge of the seat in the bed-forming position, as seen in FIGURE 6. As the seat control arm 22 is rotated forwardly in a counterclockwise direction to move the seat from the seat-forming position to the bed-forming position, a second radially extending flange 54 of control arm 22 is rotated into position to cooperate with the rear permanent support brackets 40 to support the rear of the seat in the bed-forming position.

When the seat back is moved to the bed-forming position from the seat-forming position, the seat back control arm 18 rotates counterclockwise about pivot bolt 30 and the seat back rotates clockwise about pivot bolt 20. Two permanent support brackets 56, 58 are secured to the seat back pan equidistance from the pivot bolt 20. Two support arms or abutments 60, 62 are welded or otherwise suitably secured to the support member 26. The support arms 60, 62 are positioned to cooperate with the seat back support brackets 56, 58 and support the seat back in the bed-forming position, as seen in FIGURE 3.

To move the seat and seat back from the seat-forming position to the floor-forming position, the seat control arm 22 is rotated counterclockwise and forwardly about pivot bolt 32 and the seat is rotated about pivot bolt 24 while staying substantially in seat-forming altitude. When the seat control arm 22 is substantially vertical, the front retractable support bracket 38 is retracted allowing the front of the seat to pivot counterclockwise on pivot bolt 24 until the seat pan 16 is facing upwardly. Then the retractable support bracket 38 is pulled out so that it may cooperate with a radially extending flange 54 to support the seat in the floor-forming position. The seat control arm 22 continues to rotate counterclockwise about pivot bolt 32 until the permanent support bracket 40 with hole 64 therein is guided into position with the unfolded supporting leg 46 by guide lug 48 and hole 64. The seat back is rotated forwardly about pivot bolt 30 by seat back control arm 18 until support bracket 56 cooperates with supporting arm 60 and support bracket 56 cooperates with support arm 62 to support the seat back in the floor-forming position.

It is to be understood that the invention is not intended to be limited in its application to the exact details of construction and arrangement of the parts as illustrated in the accompanying drawings since the invention is capable of other embodiments and of being practiced or carried out in various ways. It is, therefore, comprehended that various modifications may be made within the scope of this invention except as limited by the prior art and as defined by the following claims.

I claim:

1. A convertible seat comprising a support member, a seat unit, a seat back unit, said seat unit and seat back unit having a cushioned side and a floor-forming pan side, said units having a seat-forming position, a bed forming position and a floor-forming position and being selectively movable therebetween, linkage control means interconnecting said seat unit and said seat back unit with said support member for supporting said units thereupon, said linkage control means including a first control arm having a first pivotal connection at one end to said support means and a second pivotal connection at the other end to said seat unit intermediate the front and rear edges thereof, a second control arm having a third pivotal connection at one end to said support member and a fourth pivotal connection at the other end to said seat back unit intermediate the upper and lower edges thereof, said first and second control arms being movable about their said first and third pivotal connections, respectively, from a seat forming position corresponding to said units seat-forming positions to substantially horizontal positions corresponding to said units floor-forming and bed-forming positions, said first control arm pivotally supporting said seat unit for manually selectable pivotal movement about said second pivotal connection for selectively positioning said seat unit by rotating said unit to a cushion exposed position for said bed-forming and seat-forming positions and to the floor pan exposed position for said floor-forming position, said second control arm pivotally supporting said seat back unit for manually selectable pivotal movement about said fourth pivotal connection for selectively positioning said seat back unit by rotating said unit to a cushion exposed position for said bed-forming and seat-forming positions and to a floor-pan exposed position for said floor-forming positions, bracket means secured on said units, support means attached to said support member for cooperating with said bracket means for supporting one of said units in each of said selected positions, respectively, and additional support means for positioning and supporting the other of said units in each of said selected positions.

2. Apparatus as claimed in claim 1, said first control arm having a first flange and a second flange formed thereon, said flanges extending radially from said first pivotal connection between said first control arm and said support member, said first flange cooperating with said bracket means on said seat unit for supporting a portion of said seat unit in said seat forming position and said second flange cooperating with said bracket means on said seat unit for supporting a portion of said seat unit in said floor-forming position and said bed-forming position.

3. In a vehicle body, a convertible seat comprising a support member, a seat back unit having a seat back cushion on one side and a seat back pan on the opposite side, a seat unit having a seat cushion on one side and a seat pan on the opposite side, a first control arm having a first pivotal connection at one end for pivotally connecting said first control arm to said seat unit and a second pivotal connection at the other end for pivotally connecting said first control arm to said support member, a second control arm having a third pivotal connection at one end for pivotally connecting said second control arm to said seat back unit and a fourth pivotal connection at the other end for pivotally connecting said second control arm to said support member, said seat unit and said seat back unit being movable with respect to each other to any one of three selected positions, said positions comprising a seat-forming position with said cushions facing outwardly, a horizontal juxtaposed bed-forming position with said cushions positioned uppermost for forming a bed portion and a horizontal juxtaposed floor-forming position with said pans positioned uppermost for forming a floor portion, said control arms pivotally supporting said units for rotative movement about said first and third pivotal connections, respectively, during pivotal movement of said control arms about said second and fourth pivotal connections during movement between said positions, and support means for positioning and supporting said seat unit and said seat back unit in the selected position.

4. Apparatus as claimed in claim 3 wherein said support means includes supporting abutments secured to said support member, collapsible supporting legs pivotally secured to said vehicle body for movement from a collapsed stored position to an extended supporting position and support brackets associated with said seat back pan and said seat pan to position and support said seat unit and said seat back unit in positions of adjustment by cooperating with said supporting abutments attached to said support member and said collapsible supporting legs.

References Cited by the Examiner

UNITED STATES PATENTS

| 2,534,612 | 12/50 | McGee | 297—65 |
| 2,926,948 | 3/60 | Koplin et al. | 296—66 |
| 2,997,335 | 8/61 | May | 296—66 |

FOREIGN PATENTS 313,520   6/56   Switzerland.

A. HARRY LEVY, *Primary Examiner.*